(12) United States Patent
Ricker et al.

(10) Patent No.: US 12,504,255 B2
(45) Date of Patent: Dec. 23, 2025

(54) FIREARM ACCESSORY COUPLING SYSTEM

(71) Applicant: Traditional Sporting Goods, Inc., Old Saybrook, CT (US)

(72) Inventors: Karl K. Ricker, Old Saybrook, CT (US); Thomas F. Hall, Old Saybrook, CT (US)

(73) Assignee: Traditional Sporting Goods, Inc., Old Saybrook, CT (US)

( * ) Notice: Subject to any disclaimer, the term of this patent is extended or adjusted under 35 U.S.C. 154(b) by 0 days.

(21) Appl. No.: 18/758,508

(22) Filed: Jun. 28, 2024

(65) Prior Publication Data
US 2025/0116483 A1    Apr. 10, 2025

Related U.S. Application Data

(60) Provisional application No. 63/588,016, filed on Oct. 5, 2023.

(51) Int. Cl.
*F41C 9/08*    (2006.01)
*F41A 29/02*    (2006.01)

(52) U.S. Cl.
CPC .............. *F41C 9/085* (2013.01); *F41A 29/02* (2013.01)

(58) Field of Classification Search
CPC ........... F41C 9/085; F41A 29/00; F41A 29/02
See application file for complete search history.

(56) References Cited

U.S. PATENT DOCUMENTS

| | | | | | |
|---|---|---|---|---|---|
| 596,490 | A | * | 1/1898 | Edwards | F16B 7/22 |
| | | | | | 285/283 |
| 2,267,802 | A | * | 12/1941 | Purdy | F16B 7/20 |
| | | | | | 403/316 |
| 2,448,548 | A | * | 9/1948 | Purdy | F16B 7/20 |
| | | | | | 403/378 |
| 2,998,990 | A | * | 9/1961 | Plattsmier | E21B 37/10 |
| | | | | | 403/353 |
| 3,123,881 | A | * | 3/1964 | Westman | A01K 91/04 |
| | | | | | 24/701 |
| 3,345,711 | A | * | 10/1967 | Mccarthy | F16L 37/252 |
| | | | | | 403/321 |
| 3,402,950 | A | * | 9/1968 | Hertzberg | F41A 29/02 |
| | | | | | 403/112 |
| 4,399,627 | A | * | 8/1983 | Malesky | F41A 29/02 |
| | | | | | 42/95 |

(Continued)

FOREIGN PATENT DOCUMENTS

DE    202016100602 U1 *    6/2017

*Primary Examiner* — Gabriel J. Klein
(74) *Attorney, Agent, or Firm* — DeLio Peterson & Curcio LLC; Robert Curcio

(57) ABSTRACT

An interchangeable firearm accessory coupling system and method of using. The system comprises an elongated connecting member having a first portion with a recess cut therein, a sleeve in translational engagement with the connecting member, and a firearm bore accessory component removably receivable within the connecting member recess. The sleeve is translatable between an engaged position wherein the sleeve encloses the recess and a disengaged position wherein the sleeve moves to a second portion of the elongated connecting member to expose the recess, such that the firearm bore accessory component may be received or removed from the recess.

17 Claims, 8 Drawing Sheets

(56) References Cited

U.S. PATENT DOCUMENTS

| | | | | |
|---|---|---|---|---|
| 4,509,223 A * | 4/1985 | Sipple | ................... | F41A 29/00 15/210.1 |
| 4,645,373 A * | 2/1987 | Purdy | ................... | F16B 21/00 403/381 |
| 4,679,961 A * | 7/1987 | Stewart | ................... | E04B 1/19 24/654 |
| 4,901,465 A * | 2/1990 | Hsu | ................... | F41A 29/02 42/95 |
| 4,930,240 A * | 6/1990 | Bice | ................... | F41A 29/02 42/95 |
| RE33,438 E * | 11/1990 | Stewart | ................... | F16B 7/22 24/654 |
| 5,074,699 A * | 12/1991 | Blaisdell | ................ | F16C 11/069 403/135 |
| 5,446,987 A * | 9/1995 | Lee | ................... | F41C 9/085 42/61 |
| 6,145,235 A * | 11/2000 | Emerson | ................ | F41C 9/085 42/95 |
| 6,179,302 B1 * | 1/2001 | Gauthier | ................ | B23B 31/113 403/322.2 |
| 6,672,794 B2 * | 1/2004 | Reichborn | ............ | A46B 17/02 403/379.2 |
| 9,964,377 B2 * | 5/2018 | Marvin | ................... | F41A 29/02 |
| 11,692,786 B2 * | 7/2023 | Hoodecheck | ............ | F41A 29/02 42/95 |
| 2007/0261288 A1 * | 11/2007 | Perry | ................... | F41A 29/02 42/95 |
| 2011/0209379 A1 * | 9/2011 | Williams | ................ | F41A 29/02 42/95 |
| 2020/0122313 A1 * | 4/2020 | Takada | ................... | F16B 7/20 |
| 2021/0190454 A1 * | 6/2021 | Hoodecheck | ............ | F41A 29/02 |

* cited by examiner

FIREARM ACCESSORY COUPLING SYSTEM

BACKGROUND OF THE INVENTION

1. Field of the Invention

The present invention relates in general to the field of firearms, and more particularly to an interchangeable accessory system for use with various types of firearms, including muzzleloading firearms.

2. Description of the Related Art

Like most early firearms, the first rifles were muzzleloading firearms, in which the projectile and the propellant charge are loaded from the muzzle of the gun (i.e., from the forward, open end of the gun's barrel). This is distinct from the more popular modern designs of breech loading firearms. There are generally three types of muzzleloading firearms: inline 209 primers and percussion, caplock, and flintlock muzzleloaders. Inline 209 primers and percussion muzzleloaders tend to look like most modern firearms. The inline and caplock muzzleloaders differ on where the percussion cap holding nipple is attached. In an inline muzzleloader, the percussion cap is in line with the hammer and the barrel. The inline has the nipple attached to the barrel at the breech and accessed by a bolt or break action. Also, the inline model has a removable breech plug to facilitate cleaning. Caplock rifles have a side-mounted firing pin similar to the flintlock rifle, and operate and load in much the same way, but use a more modern pre-loaded firing cap to fire the rifle. A flintlock style of muzzleloader dates back to the 17th century and features a flintlock mechanism that produces sparks when a piece of flint strikes its steel frizzen.

Loading a traditional black powder muzzleloader firearm generally involves a certain amount of complexity (as compared to the loading of modern firearms). For loose, granular powder such general steps include: a) making sure the rifle is not primed; b) making sure the rifle bore is clean of fouling and oil; c) setting a powder measure for a desired powder charge; d) pouring the powder into the measure and then into the muzzle end of the rifle; and e) using a ramrod, pressing the bullet, such as a patched round ball, past the rifling and down the bore until it contacts the powder charge.

This typical loading operation includes ensuring that a measured amount of propellant charge is placed into the muzzle, followed by the insertion of the projectile into the muzzle. In many cases, wadding, which may be a piece of fabric, felt, cloth, card, or the like, is placed around/behind the projectile, such that the wadding is between the propellant charge and projectile after loading. To ensure optimum pressures within the barrel and proper launching of the projectile, a ramrod is utilized to drive the wadding and projectile down the barrel to ensure firm seating of the projectile and wadding on the propellant charge.

Modern cartridge-based firearms and muzzleloading firearms often require numerous accessories in order to effectively operate the firearm safely and correctly. Most, if not all, of these accessories need to be carried or otherwise accessible to the operator. Modern cartridge-based firearms will require similar cleaning functions as muzzleloading firearms, and muzzleloading firearms will require the additional loading functions as well. Thus, the interchangeable accessories may be typically classified as: (1) loading accessories; and (2) cleaning accessories.

Loading accessories assist the operator in the process of loading operations. Some examples of loading accessories include:
 loading rods;
 capper tools;
 bullet starters;
 powder measurers;
 powder flasks; and
 powder nipples.

Cleaning accessories are designed to keep the muzzle bore clear of debris or fouling which may accumulate over time. Examples include:
 cleaning rods;
 cleaning jags;
 fouling scrapers;
 cleaning patches;
 cleaners;
 bore butter;
 brushes;
 swabs;
 powder nipple picks; and
 powder nipple grease.

Loading or charging propellants into muzzleloading guns has long presented problems. The propellant, either black powder or a substitute thereof, is normally handled in granular form (grains), with each charge being determined by measuring out a selected weight or volume of the propellant from a bulk supply, delivering it to the muzzle end bore of the gun, placing a projectile in the bore, and seating the charge by ramrod into the breech. The charging of this propellant thus requires special tools and implements which must be carried to the field of use and kept readily available for re-loading. In addition, there is always the risk of improper measurement and spillage of loose powder. Other problems exist. It is difficult to obtain uniform powder compaction from load to load. It is difficult to re-load with speed and accuracy, and the use of smokeless powder, if not properly measured, could pose an additional hazard.

Cleaning of a firearm, whether a muzzleloader or other modern cartridge-based firearm, is also if importance for maintaining proper operation and gun safety. Muzzleloading firearms are generally more difficult to clean, and require a more concerted effort to ensure proper maintenance. Black powder, and even substitutes such as Pyrodex, are very corrosive, which can damage the muzzleloading firearm over time.

Moreover, from a safety standpoint, running a damp cleaning patch down the barrel between shots is a good idea. If there happened to be a hot ember in the bore from the previous shot, this could cause the next powder load to ignite when it's poured down the barrel. It is generally accepted that proper use requires some form of wiping between shots to establish at least a consistent acceptable level of fouling of the barrel.

Many of the aforementioned accessories required by a firearm user are small, threaded pieces which can be cumbersome to carry, attach, and/or remove, requiring an operator to expend time and energy on a process which, though necessary to the proper performance of the firearm, can be unpleasant to perform. For example, it is not uncommon to use cleaning jag extenders to facilitate cleaning the bore; however, this adds yet another small part that the user needs to attend to in the field. Thus, a need exists for an accessory system which can both reduce the number of accessories needed by the operator while improving the speed in which these accessories can be exchanged on a rod-based system.

SUMMARY OF THE INVENTION

Bearing in mind the problems and deficiencies of the prior art, it is therefore an object of the present invention to provide an interchangeable accessory coupling system which can easily swab varying bore accessory components.

Yet another object of the prevent invention is to provide a universal fastening system for a plurality of bore accessory components.

Another object of the present invention is to provide a rod accessory which can reduce the number of separate rods and accessories needed for loading and cleaning operations of a firearm.

Still other objects and advantages of the invention will in part be obvious and will in part be apparent from the specification, where in a first aspect, the present invention is directed to a firearm interchangeable accessory coupling system, comprising: an elongated connecting member having a rearward end and a forward end, including: a middle body component; and an accessory-end component, wherein the accessory-end component includes a recess cut therethrough; a sleeve in translational engagement with the elongated connecting member's accessory-end component; a resilient component within an interior portion of the elongated connecting member, biasing the sleeve in a direction towards the elongated connecting member forward end; a loading element having a locking member at a rearward end, configured to be received by the recess within the accessory-end component recess at the elongated connecting member forward end, and an intermediate flange extending radially outwards; a receiving coupler attachable to the rearward end of the elongated connecting member; a firearm bore accessory component removably attachable to the loading element; wherein the sleeve is translatable between an engaged position wherein the sleeve encloses the recess, to a disengaged position wherein the sleeve moves toward the middle body component of the elongated connecting member, thereby exposing the recess.

The locking member may include a substantially spherical, bulbous rearward end attached to a shaft to extend the bulbous end from the intermediate flange.

An interior registration surface may be formed on an inner wall within the accessory-end component segment of elongated connecting member for registration with the substantially spherical, bulbous rearward end of the locking member.

A sleeve is in mechanical communication with the resilient component via a pin.

A pin travels within an elongated, longitudinally directed channel of the accessory-end component segment when acted upon by the sleeve.

The interior portion may include an inner diameter proximate the forward end of the elongated connecting member, the inner diameter being smaller than an outer diameter of the bulbous end of the locking member, such that the bulbous end is secured within the interior portion, and prohibited from axial release through an opening in the forward end.

As a result of a biasing force of the resilient component, the sleeve encloses the recess, securing the locking member within the accessory-end component recess.

The middle body component includes an outer diameter, and the accessory-end component includes an outer diameter smaller than the middle body component outer diameter, such that a shelf is formed therebetween, the shelf is configured to form a stop for translational movement of the sleeve in a direction towards the elongated connecting member rearward end.

The flange of the loading element contacts and engages the accessory-end component at a forward end opening of the elongated connecting member forward end, ensuring coaxial alignment of the firearm bore accessory component with the elongated connecting member.

The firearm bore accessory component may include an internal cavity that is partially conical in shape, having converging internal sidewalls that feed into an axially straight section of sidewalls having at least an initial diameter matching the smallest diameter of the conical portion, the conical portion presenting a geometrical cavity for a conically shaped bullet or round projectile.

The locking member may include a linking portion receivable within an opening end of the firearm bore accessory component in an interference engagement, the interference engagement formed by a radially inward extension tab on a rearward end of the firearm bore accessory component.

In a second aspect, the present invention is directed to a firearm accessory coupling system, comprising: an elongated connecting member having a rearward end and a forward end, including: a middle body component; and an accessory-end component, wherein the accessory-end component includes a recess cut therethrough; a sleeve in translational engagement with the elongated connecting member's accessory-end component, the sleeve being in mechanical communication with a resilient component via a pin; the resilient component within an interior portion of the elongated connecting member, providing a biasing force against the sleeve in a direction towards the elongated connecting member forward end, the interior portion including an inner diameter proximate the forward end of the elongated connecting member, the interior portion inner diameter being smaller than an outer diameter of the bulbous end of the locking member, such that the bulbous end is secured within the interior portion, and prohibited from axial release through an opening in the forward end, and wherein as a result of the biasing force of the resilient component, the sleeve encloses the recess, securing the locking member within the accessory-end component recess; a loading element having a locking member at a rear end, configured to be received by the recess within the accessory-end component recess at the elongated connecting member forward end, and an intermediate flange extending radially outwards, the locking member includes a substantially spherical, bulbous rearward end attached to a shaft to extend the bulbous end from an intermediate flange; a receiving coupler attachable to the rearward end of the elongated connecting member; a firearm bore accessory component removably attachable to the loading element; wherein the sleeve is translatable between an engaged position wherein the sleeve encloses the recess, to a disengaged position wherein the sleeve moves toward the middle body component of the elongated connecting member, thereby exposing the recess.

In a third aspect, the present invention is directed to a method for coupling a firearm accessory to a firearm accessory coupling system, comprising the steps of: moving a sleeve of the firearm accessory coupling system to an engaged position wherein the sleeve exposes a recess disposed on an elongated connecting member first portion; connecting a firearm bore accessory component to a loading element and a locking member of the firearm accessory coupling system; connecting the loading element to the elongated connecting member by aligning the firearm bore accessory component into a position coaxial with the firearm accessory coupling system, whereby a substantially spherical, bulbous rearward end of the locking member attached to a shaft to extend the bulbous end from an intermediate flange on the loading element, is inserted within the recess; and releasing the sleeve to a disengaged position wherein the sleeve encloses the recess under a biasing force to secure the firearm accessory attached to the loading element to the elongated connecting member.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
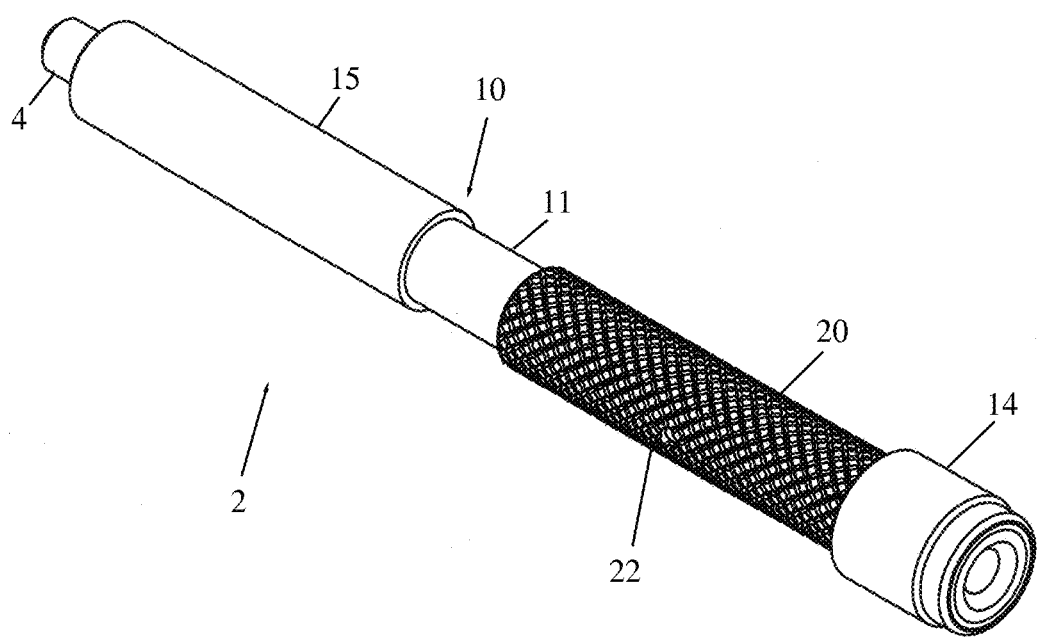
FIG. 1 depicts a perspective view of an accessory coupling system according to one embodiment of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise. Also, as used herein, the term "and/or" includes any and all combinations of one or more of the associated listed items. It will be further understood that the terms "include" and/or "including" when used herein, specify the presence of stated features, steps, operations, elements, and/or components, but do not preclude the presence or addition of one or more other features, steps, operations, elements, components, and/or groups thereof.

It will be further understood that when an element is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected," "coupled", "operatively coupled", or the like to another element, it can be directly connected, coupled, or operatively coupled to the other element or intervening elements may be present. Moreover, it can be removable or integral with the other element and/or intervening elements. In contrast, when an element is referred to as being "directly connected", "directly coupled", or "directly operatively coupled" to another element, there are no intervening elements present.

Relative terms such as "below," "above," "upper," "lower," "horizontal," "vertical," "top," "bottom," "rear," "front," "side," or the like may be used herein to describe a relationship of one element or component to another element or component as illustrated in the figures. It will be understood that these terms are intended to encompass different orientations of the device in addition to the orientation depicted in the figures.

Additionally, in the subject description, the words "exemplary," "illustrative," or the like are used to mean serving as an example, instance or illustration. Any aspect or design described herein as "exemplary" or "illustrative" is not necessarily intended to be construed as preferred or advantageous over other aspects or design. Rather, use of the words "exemplary" or "illustrative" is merely intended to present concepts in a concrete fashion.

In describing the embodiment of the present invention, reference will be made herein to FIGS. 1-12 of the drawings in which like numerals refer to like features of the invention.

The firearm accessory coupling system 2 of the present invention is used in combination with loading and/or cleaning rods, which in the case of a muzzleloading firearm, the rod may be a ramrod. These rods include an end which is grasped by the operator during loading/cleaning operations and a second end for insertion within the firearm barrel bore. The rod second end includes a coupling element for receiving an interchangeable firearm accessory in threaded, or other mechanical engagement.

FIG. 1 depicts a perspective view of an accessory coupling system according to one embodiment of the invention. The substantially cylindrical accessory coupling system 2 comprises an elongated connecting member 10 having a coupling end 4 for releasable engagement with the coupling element of a rod (not shown). Connecting member 10 includes a larger diameter middle body component 15 extending from the coupling end 4 towards an accessory-end component segment 11. Coupling end 4 is configured to attach the accessory coupling system to a rod (which may be a ramrod for a muzzleloading firearm), or other elongated component to enable the accessory coupling system to enter a barrel. Middle body component 15 is shown integral with accessory-end component segment 11; however, any attachment scheme between these two components may achieve the desire resultant one-piece construction when attached. The attachment scheme should not allow for excessive rotation between the two components, in order to ensure proper rotational movement for certain cleaning accessories. Middle body component 15 has an outer diameter that is larger than the diameter of accessory-end component segment 11, such that a shelf 19 is formed at their junction.

A substantially cylindrical open-ended sleeve 20 is sized to fit circumferentially around and engage the accessory-end component segment 11 in a transition or clearance engagement. Accessory attachment connector 14 is secured to the accessory-end component segment 11 via a loading element (not shown). Accessory attachment connector 14 (firearm bore accessory component) is designed to accommodate various loading and/or cleaning accessories, such as a patch puller, ball puller, bore brushes and/or swabs, loading and/or cleaning jags, fouling scrapers, and the like. The firearm bore accessory component may be fabricated from various materials, including, but not limited to, plastic or metal, and may be injection molded. Materials having moldable properties with sufficient strength for the appropriate performance are not prohibited from the present design.

Figure 2:
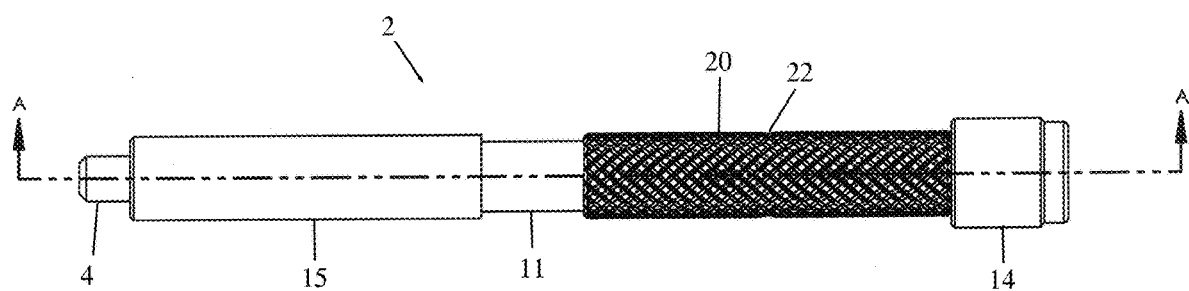
FIG. 2 depicts a side view of the accessory coupling system of FIG. 1.
Figure 3:
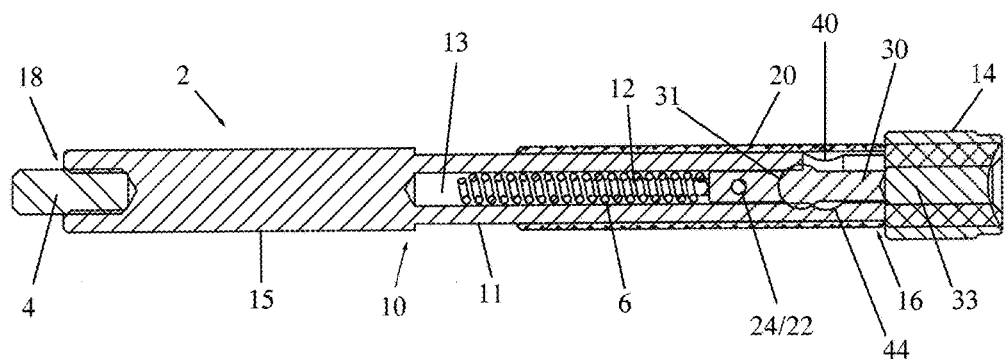
FIG. 3 depicts a cross-sectional view of the accessory coupling system of FIG. 2, along lines A-A.
Figure 8:
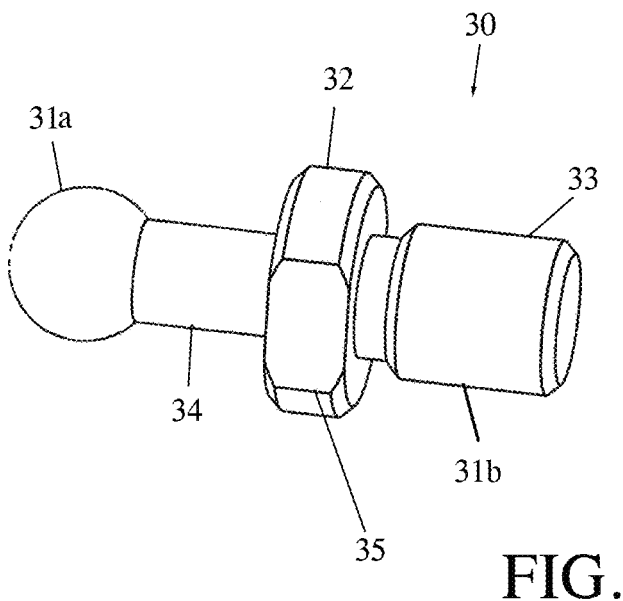
FIG. 8 depicts a perspective view displaying a loading element of an accessory coupling system according to one embodiment of the invention.

FIGS. 2 and 3 depict side and cross-sectional views of the accessory coupling system according to one embodiment of the invention. Elongated connecting member 10 includes a rearward end opening 18 for receiving coupler 4 (which is preferably a mechanical fastener for communication with the rod, but may be for communication with other accessories). Receiving coupler 4 may be in an interference engagement, frictional engagement, or other releasably attachable configuration with elongated connecting member 10, providing similar attachment schemes on the opposite side for connecting receiving coupler 4 with a rod, or in the case of a muzzleloading firearm, a ramrod, or the like. A forward end opening 16 ultimately receives a loading element 30 that consists of a locking member 31 and an intermediate situated flange 32. Locking member 31 is configured to connect at a forward end 31b to an attachment connector or accessory 14, which may be either a connector element for attachment to an accessory or the accessory itself. In this illustrious example, the attachment connector/accessory 14 is shown as a connector, but it may be replaced with a complete accessory, releasably attachable to the forward end 31b of locking member 31. Locking member 31, which represents the extension segments of loading element 30 in forward and rearward directions, connects at a rearward end 31a to accessory-end component segment 11 of elongated connecting member 10. Locking member 31 may be integral with attachment connector/accessory 14 or secured by any number of different forms of attachment thereto, including but not limited to threaded fit, snap fit, insertion fit, and frictional fit, to name a few. Locking member 31, which is depicted as having a substantially spherical, bulbous end 31a, includes a shaft 34 (as depicted in FIG. 8) that extends the bulbous end 31a from the flange 32 of loading element 30. An interior registration surface 44 is formed on the inner wall within the accessory-end component segment 11 of connecting member 10 for registration with the substantially spherical, bulbous end 31a of locking member 31.

A resilient member 6, such as a spring or the like, is received within the connecting member interior portion 13 of accessory-end component segment 11, and is in communication with the open-ended sleeve 20 via a pin 24. Sleeve opening 22 accepts pin 24, securing the resilient member 6 to the open-ended sleeve 20 and within the connecting member interior portion 13 (See FIG. 10A).

Resilient member 6 is configured to bias sleeve 20 towards the forward end opening 16 of the connecting member 10. In a loading process for securing in place loading element 30, sleeve 20 is urged rearward towards rearward end opening 18 and coupler 4 in the direction of arrow A (see FIG. 10A), deforming the resilient member 6 as pin 24, in mechanical communication with resilient member 6 and responsive to said sleeve movement, travels within an elongated, longitudinally directed channel 12 of accessory-end component segment 11 (see also FIG. 7 and FIG. 10A). Upon movement of sleeve 20 towards rearward end opening 18, recess 40 is exposed, allowing loading and unloading of the loading element 30 and locking member 31 within the interior portion 13. Locking member 31 is configured to be inserted within recess 40. Interior portion 13 includes an inner diameter proximate forward end opening 16 that is smaller than the bulbous end 31a of locking member 31, which secures the bulbous end within interior portion 13, and prohibits axial release through forward opening 16.

Release of any holding force on sleeve 20 will cause the resilient member 6 to bias the sleeve towards forward end opening 16. After placement of the loading element 30 with its locking member 31 within the interior portion 13, upon release, sleeve 20 will enclose the recess 40, capturing and securing the bulbous end 31a of locking member 31 of loading element 30 within the connecting member 10, and prohibiting any movement of loading element 30 in a radially outwards direction.

Resilient member 6 comprises any elastic mechanical device, though other configurations are not meant to be precluded. In an alternate embodiment of the invention, resilient member 6 comprises a compression spring consisting of a light corrosion resistant metal or metal alloy material. In at least one embodiment, the compression spring may have an outside diameter on the order of 0.125 inches, with the connecting member interior portion having a diameter slightly larger at approximately 0.140 inches. In this instance, the wire diameter of the compression spring may be on the order of 0.020 inches, and typically require a force load of 4 lbs-6 lbs, and more preferably about 5.6 lb, before complete deformation. In one embodiment, the compression spring may have a free length of about 0.250 inches to 1.500 inches, a solid height of 0.130 inches to 0.700 inches, and a spring rate of approximately 47.40 lb/in to 6.50 lb/in.

Figure 4:
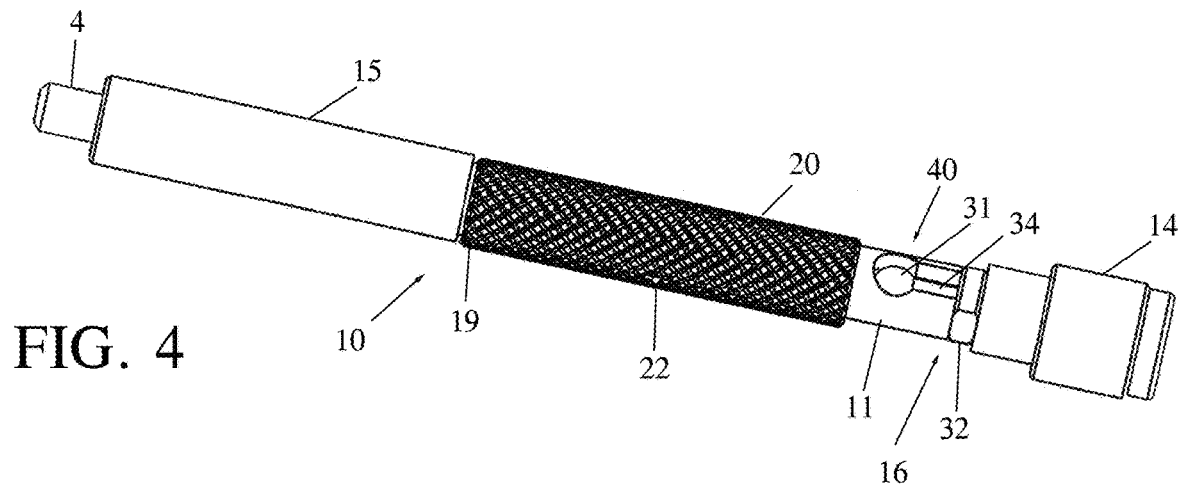
FIG. 4 depicts a perspective view of an accessory coupling system according to one embodiment of the invention, displaying a sleeve in an engaged position.
Figure 5:
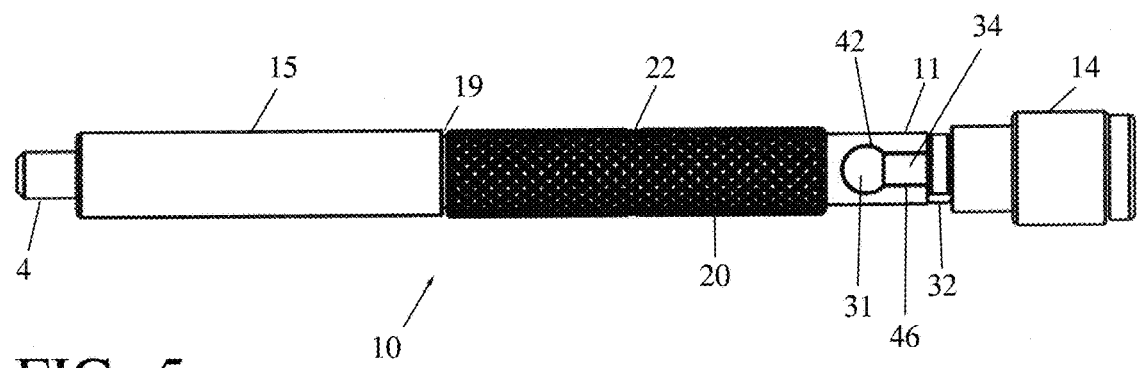
FIG. 5 depicts a top plan view of the accessory coupling system of FIG. 4.
Figure 6:
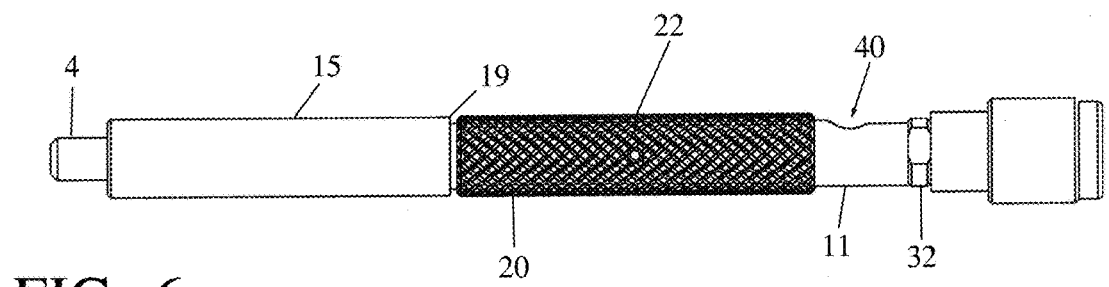
FIG. 6 depicts a side view of the accessory coupling system of FIG. 4.

FIGS. 4-6 depict various views of the accessory coupling system 2 with sleeve 20 in the engaged or release/attachment position according to an embodiment of the invention. In these figures, sleeve 20 is shown urged reward in the direction of coupling end 4, and is prevented from going any further in this axial direction by shelf 19 of elongated connecting member 10 at the junction of middle body component and accessory-end component segment 11. In the engaged position, recess 40 is exposed, which is sized to receive the substantially spherical, bulbous end 31a of locking member 31, as well as shaft 34 of the loading element 30 in a clearance or transition engagement. Flange 32 of loading element 30 contacts and engages the accessory-end component 11 at forward end opening 16, ensuring coaxial alignment of attachment connector/accessory 14 with connecting member 10. Recess 40 is shown as an engagement cavity 46 extending on the accessory-end component 11 to a substantially circular opening 42, but may also be configured as a tapered or dovetailed recess design in alternate embodiments of the invention. The shape of the recess may be arbitrary with the condition that it provide a clearance to receive the shape of loading element 30 with its locking member 31 and shaft 34 within interior portion 13. It is clear that other loading element shapes and receiving recess shapes may be utilized without compromise to the intent and functionality of the attachment scheme of the present invention.

Figure 7:
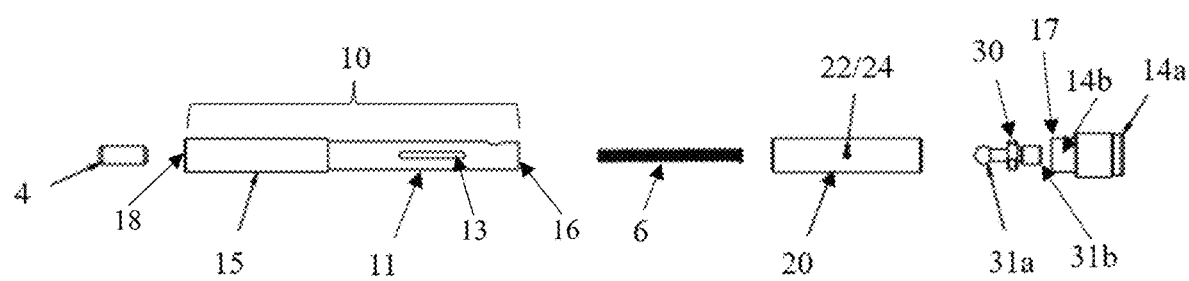
FIG. 7 depicts an exploded view of an accessory coupling system according one embodiment of the invention.

FIG. 7 depicts an exploded view of the accessory coupling system according one embodiment of the invention. During assembly, receiving coupler 4 may be received within the rearward end opening 18 of the connecting member 10 in an interference engagement. In one embodiment the coupling end may be adhesively fitted to the rearward opening end; however, in other embodiments, the coupling end may be fitted to the rearward opening end by welding or bonding together using solvent, adhesive, spin-welding, vibration-welding, ultrasonic-welding or laser-welding techniques. Coupler 4 may also be releasably attached to connecting member 10 by a snap fit, insertion fit, threaded fit, or frictional fit.

As shown in FIG. 7, elongated connecting member 10 includes middle body component 15 extending from the coupler 4 towards an accessory-end component 11. A substantially cylindrical open-ended sleeve 20 is sized to fit around and engage the accessory-end component 11 in a transition or clearance engagement. Resilient member 6 is inserted within the forward end opening 16 to the interior portion (not shown) of the accessory-end component 11. A channel 12 is cut within the accessory-end component 11, and pin 24 is received within the sleeve opening 22, and inserted through channel 12 and resilient member 6 to form translational movement between the open-ended sleeve and the resilient member. Resilient member 6 with pin 24 will bias sleeve 20 towards the forward end opening 16 of the connecting member 10, such that the sleeve 20 will enclose the recess 40 of the connecting member 10.

Linking portion 33 having end 31b of locking member 31 may be received within the attachment connector/accessory 14 at its rearward open end 17 in any number of engagement schemes, including an interference engagement. In one embodiment, the linking element is adhesively fitted to the attachment connector/accessory 14 opening 17; however, in other embodiments, the linking element is fitted to the attachment connector/accessory 14 opening end 17 by welding or bonding together using solvent, adhesive, spin-welding, vibration-welding, ultrasonic-welding or laser-welding techniques. Releasably attachable snap-fit or frictional-fit may also be utilized for this connection.

FIG. 8 depicts a perspective view displaying the loading element 30 of the accessory coupling system according to one embodiment of the invention. A shaft 34 of the locking member 31 extends forward from the substantially spherical, bulbous end 31a towards flange 32. During communication with the connecting member 10, flange 32 contacts and engages the connecting member forward end opening 16, ensuring coaxial alignment of the loading element 30 and connecting member (not shown). Linking portion 33, which includes the shaped forward end 31b of locking member 31, extends forward the opposing surface of the flange and may be received within the attachment connector/accessory 14 opening end 17 in a removable mechanical engagement/attachment, or may be welded or bonded together using adhesives and the like. Flange 32 may include a flat portion 35 to provide a gripping surface to the operator doing loading and unloading of the accessory.

Figure 9:
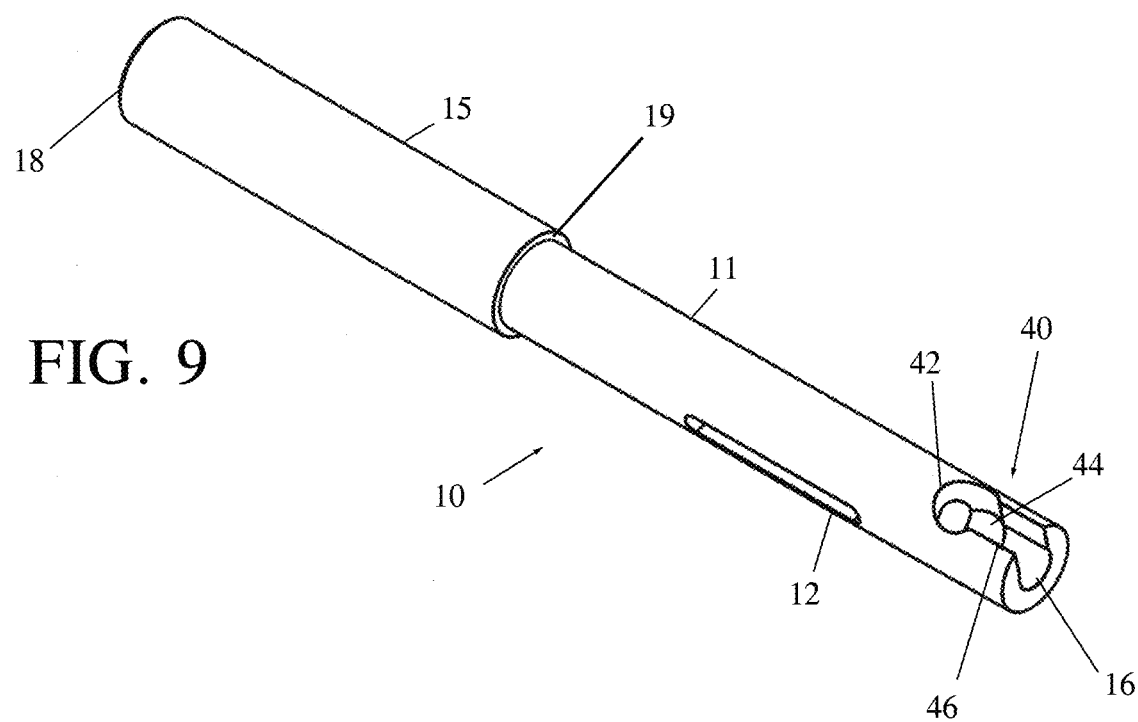
FIG. 9 depicts a perspective view displaying a connecting member of an accessory coupling system according to one embodiment of the invention.

FIG. 9 depicts a perspective view displaying a connecting member of the accessory coupling system according to one embodiment of the invention. Elongated connecting member 10 includes a rearward end opening 18 for receiving a coupling end (not shown), and a forward end opening 16 for receiving the loading element (not shown). The interior registration surface 44 is formed within the recess 40 of connecting member 10 for registration with the loading element. The middle body component 15 extends from rearward end opening 18 towards an accessory-end component 11, having a smaller diameter than the middle body component 15, which forms the retaining shelf 19. Recess 40 is sized to receive the loading element therein, which in turn, secures the attachment connector/accessory 14, and is shown as an engagement cavity 46 extending through the accessory-end component 11 sidewall and terminates at a substantially circular opening 42. In alternate embodiments, recess may be configured as a tapered or dovetailed design. A channel 12 is cut within the accessory-end component 11, and a pin is received within the channel to secure the sleeve and resilient member in translational communication.

Figure 10A:
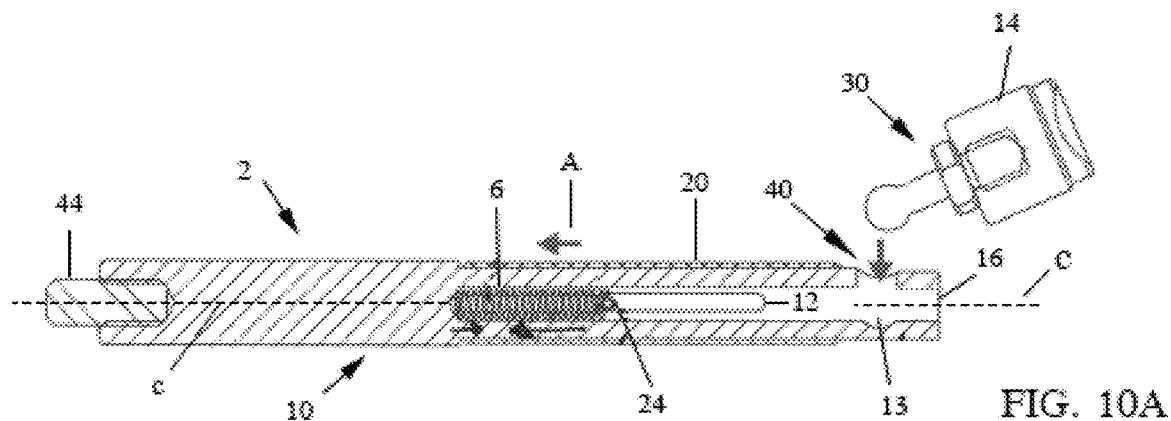
FIGS. 10A-10D depict cross-sectional views displaying the method of using the accessory coupling system according to one embodiment of the invention.
Figure 10B:
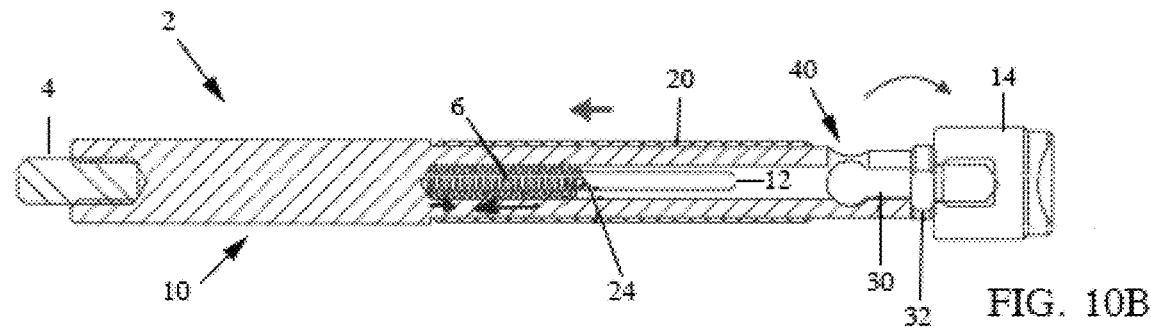
Figure 10C:
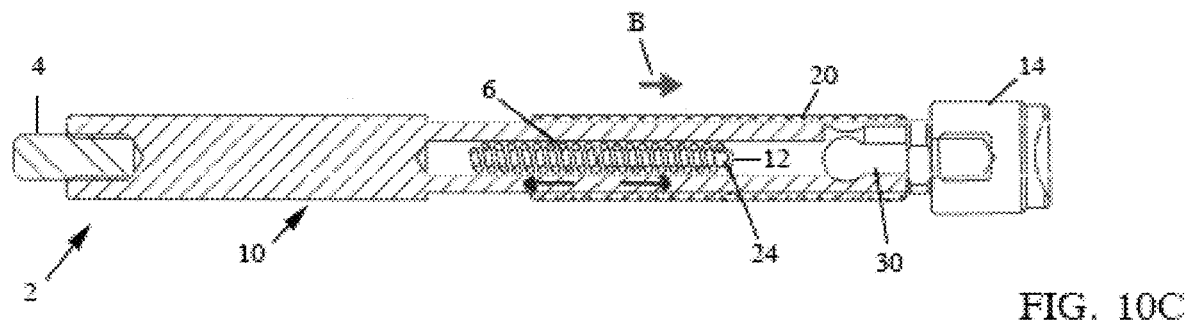
Figure 10D:
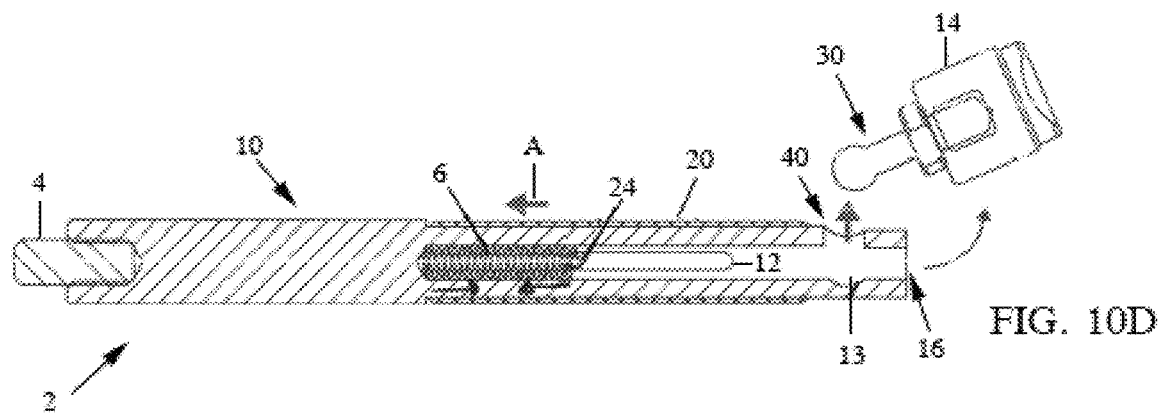

FIGS. 10A-10D depict cross-sectional views displaying the method of using the accessory coupling system according to one embodiment of the invention. In FIG. 10A, sleeve 20 has been moved rearward in the direction of coupling end 4 as denoted by arrow A, compressing resilient member 6 and exposing recess 40 at the forward end of the coupling system. Loading element 30 is shown attached to attachment connector/accessory 14, and situated above recess 40, allowing for it to be placed and secured within interior 13 of the connecting member 10, and rotated axially inwards with respect to the axis of connecting member 10 such that flange 32 contacts the forward opening end 16, bringing the loading member and accessory attachment connector 14 into coaxial alignment with the connecting member 10, as seen in FIG. 10B. After release of the sleeve 20, resilient member 6 will urge sleeve 20 towards the forward end opening 16 in the direction of arrow B, enclosing the recess 40 and securing the loading element 30 within the interior 13 (FIG. 10C). To detach the accessory 14, sleeve 20 is again translated rearward toward the coupling end in the direction of arrow A, compressing the resilient member 6 and allowing counter-rotation of the loading element 30 and accessory 14, so that the accessory and/or accessory connector may be removed coupling system 2.

Figure 11A:
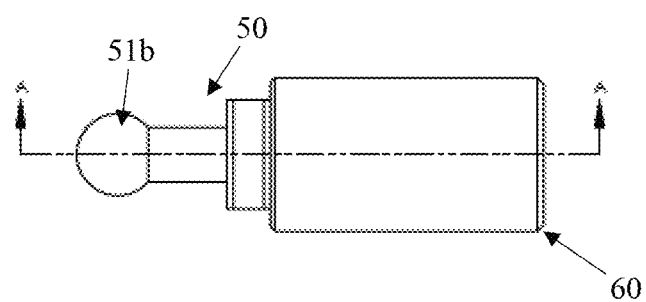
FIG. 11A depicts another embodiment of the loading element of the present invention.
Figure 11B:
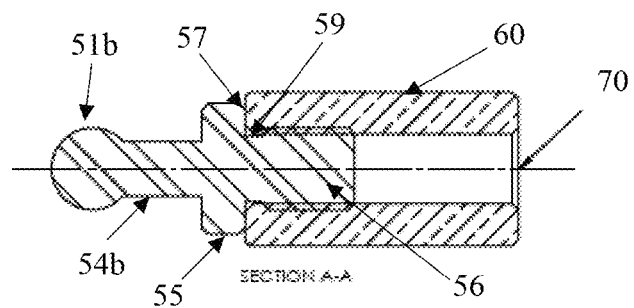
FIG. 11B is a cross-sectional view of the loading element of FIG. 11A as viewed from the Section A-A axis.

FIG. 11A depicts yet another embodiment of the loading element of the present invention. Loading element 50 is depicted spherical locking member 51b attached to accessory attachment connector 60. FIG. 11B is a cross-sectional view of the loading element of FIG. 11A as viewed from the Section A-A axis. Attachment end 51b connects to shaft 54b, which in turn terminates at flange 55. Linking portion 33b of loading element 30b may be received within the accessory opening end 57 in an interference engagement. The interference engagement is achieved by a radially inward resilient extension tab 59 on the rearward end of accessory attachment connector 60. Cylindrical segment (linking element) 56 has a diameter that is slightly larger than the internal diameter of the resilient extension tab 59, such that upon insertion, the cylindrical segment will be held in place by the resilient extension tab. Complementary ridges may be formed on the extension tab and the internal wall of the accessory attachment connector to prohibit rotation about the longitudinal axis if such movement prohibition is required. In one embodiment the linking element 56 may be adhesively fitted to the accessory end opening; however, in other embodiments, the linking element may be fitted to the accessory opening end by welding or bonding together using solvent, adhesive, spin-welding, vibration-welding, ultrasonic-welding or laser-welding techniques.

Connecter portion 70 of accessory attachment connector 60 may be adapted for a threaded fit, such as a 10-32 adaptor thread, which would accommodate many current accessories, and may also be threaded for other cleaning accessory sizes.

Figure 12A:
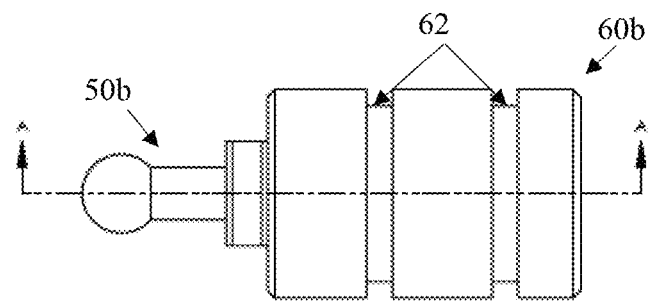
FIG. 12A depicts a side view of yet another embodiment of the loading element/accessory attachment connector configuration of the present invention.
Figure 12B:
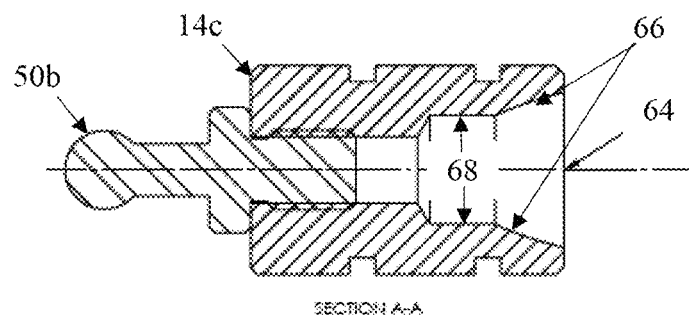
FIG. 12B is a cross-sectional view of the loading element/accessory attachment connector configuration of FIG. 12A.

FIGS. 12A and 12B depict a side view of yet another embodiment of the loading element/accessory attachment connector configuration of the present invention. Loading element 50b is shown secured within accessory attachment connector 60b. Accessory attachment connector 60b is shown having multiple outer surface diameter indentations 62, which helps to facilitate gripping by a user. Importantly, receiving end 64 of accessory attachment connector 60b includes an internal cavity that is partially conical in shape, having converging internal sidewalls 66 that feed into an axially straight section of sidewalls 68 which has, at least, an initial diameter matching the smallest diameter of the conical portion. This conical portion presents a geometrical cavity for a conical bullet or a round projectile.

Figure 12C:
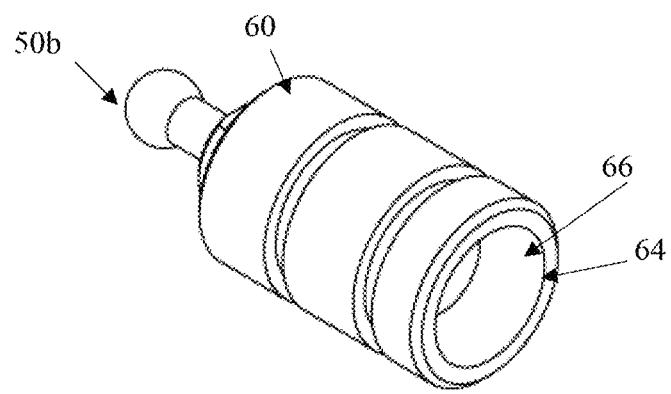
FIG. 12C is a perspective view of the loading element/accessory attachment connector of FIG. 12A.

FIG. 12B is a cross-sectional view of the loading element/accessory attachment connector configuration of FIG. 12A. Loading element 50b is similar in function to loading elements 30 and 50 of prior embodiments. FIG. 12C is a perspective view of the loading element/accessory attachment connector of FIG. 12A.

In an alternative embodiment, the present invention includes a method for coupling a firearm accessory to a firearm accessory coupling system, comprising the steps of: a) moving a sleeve of the firearm accessory coupling system to an engaged position wherein the sleeve exposes a recess disposed on an elongated connecting member first portion; b) connecting a firearm bore accessory component to a loading element and a locking member of the firearm accessory coupling system; c) connecting the loading element to the elongated connecting member by aligning the firearm bore accessory component into a position coaxial with the firearm accessory coupling system, whereby a substantially spherical, bulbous rearward end of the locking member, attached to a shaft to extend the bulbous end from an intermediate flange on the loading element, is inserted within the recess; and d) releasing the sleeve to a disengaged position wherein the sleeve encloses the recess under a biasing force to secure the firearm accessory attached to the loading element to the elongated connecting member.

Thus, the present invention provides one or more of the following advantages: an accessory coupling system which can easily swab varying bore accessory component; a universal fastening system for a plurality of bore accessory components; and a rod-based accessory which can reduce the number of separate rods and accessories needed for cleaning a cartridge-based firearm, and/or for loading and cleaning operations of a muzzleloading firearm.

Although specific embodiments have been illustrated and described herein, those of ordinary skill in the art appreciate that any arrangement which are calculated to achieve the same purpose may be substituted for the specific embodiments shown and that the present disclosure has other applications in other environments. This application is intended to cover any adaptations or variations of the present disclosure. The descriptions provided herein are in no way intended to limit the scope of the present disclosure to the specific embodiments described herein.

Thus, having described the invention, what is claimed is:

1. A firearm accessory coupling system, comprising:
an elongated connecting member having a rearward end and a forward end, including:
a middle body component; and
an accessory-end component, wherein said accessory-end component includes a recess cut therethrough;
a sleeve in translational engagement with said elongated connecting member's accessory-end component;
a resilient component within an interior portion of said elongated connecting member, capable of recovering its size and shape after deformation caused by compressive stress, said resilient component biasing said sleeve in a direction towards said elongated connecting member forward end;
a loading element comprising a locking member at a rear end having a bulbous end and a shaft that extends the bulbous end from an intermediate flange, configured to be received by said recess within said accessory-end component recess at said elongated connecting member forward end, and said intermediate flange extending radially outwards;
a receiving coupler attachable to said rearward end of said elongated connecting member; and
a firearm bore accessory component removably attachable to said loading element;
wherein said sleeve is translatable between an engaged position wherein said sleeve encloses said recess, to a disengaged position wherein said sleeve moves toward said middle body component of the elongated connecting member, thereby exposing said recess; and
wherein said intermediate flange contacts and engages said accessory-end component at a forward end opening of said elongated connecting member forward end, ensuring coaxial alignment of said firearm bore accessory component with said elongated connecting member.

2. The firearm accessory coupling system of claim 1 wherein said locking member bulbous end is a substantially spherical, bulbous rearward end attached to said shaft.

3. The firearm accessory coupling system of claim 2 wherein an interior registration surface is formed on an inner wall within said accessory-end component of elongated connecting member for registration with said substantially spherical, bulbous rearward end of said locking member.

4. The firearm accessory coupling system of claim 1 wherein said sleeve is in mechanical communication with said resilient component via a pin.

5. The firearm accessory coupling system of claim 4 wherein said pin travels within an elongated, longitudinally directed channel of said accessory-end component segment when acted upon by said sleeve.

6. The firearm accessory coupling system of claim 1 wherein said interior portion includes an inner diameter proximate said forward end of said elongated connecting member, said inner diameter being smaller than an outer diameter of said bulbous end of said locking member, such that said bulbous end is secured within said interior portion, and prohibited from axial release through an opening in said forward end.

7. The firearm accessory coupling system of claim 1 wherein as a result of a biasing force of said resilient component, said sleeve encloses said recess, securing said locking member within said accessory-end component recess.

8. The firearm accessory coupling system of claim 1 wherein said a middle body component includes an outer diameter, and said accessory-end component includes an outer diameter smaller than said middle body component outer diameter, such that a shelf is formed therebetween, said shelf configured to form a stop for translational movement of said sleeve in a direction towards said elongated connecting member rearward end.

9. The firearm accessory coupling system of claim 1 wherein said recess presents an engagement cavity extending on said accessory-end component and forming a substantially circular opening for receiving said locking member.

10. The firearm accessory coupling system of claim 1 wherein said recess forms a tapered or dovetailed recess.

11. The firearm accessory coupling system of claim 1, wherein said receiving coupler 4—is received within an opening of said rearward end of said elongated connecting member in an interference engagement, or by adhesively attached engagement, welding, including spin-welding, vibration-welding, ultrasonic-welding, or laser-welding, or by a snap fit, insertion fit, threaded fit, or frictional fit.

12. The firearm accessory coupling system of claim 1, wherein said firearm bore accessory component includes an internal cavity that is partially conical in shape, having converging internal sidewalls that feed into an axially straight section of sidewalls having at least an initial diameter matching the smallest diameter of said conical portion, said conical portion presenting a geometrical cavity for a conically shaped bullet or round projectile.

13. The firearm accessory coupling system of claim 1, wherein said receiving coupler is attached to a rod, wherein if the firearm is a muzzleloading firearm, the receiving couple is attachable to a ramrod.

14. A firearm accessory coupling system, comprising:
an elongated connecting member having a rearward end and a forward end, including:
a middle body component; and
an accessory-end component, wherein said accessory-end component includes a recess cut therethrough;
a sleeve in translational engagement with said elongated connecting member's accessory-end component;
a resilient component within an interior portion of said elongated connecting member, capable of recovering its size and shape after deformation caused by compressive stress, said resilient component biasing said sleeve in a direction towards said elongated connecting member forward end;
a loading element comprising a locking member at a rear end having a bulbous end and a shaft that extends the bulbous end from an intermediate flange, configured to be received by said recess within said accessory-end component recess at said elongated connecting member forward end, and said intermediate flange extending radially outwards;
a receiving coupler attachable to said rearward end of said elongated connecting member; and
a firearm bore accessory component removably attachable to said loading element;
wherein said sleeve is translatable between an engaged position wherein said sleeve encloses said recess, to a disengaged position wherein said sleeve moves toward said middle body component of the elongated connecting member, thereby exposing said recess;
wherein said firearm bore accessory component includes an internal cavity that is partially conical in shape, having converging internal sidewalls that feed into an axially straight section of sidewalls having at least an initial diameter matching the smallest diameter of said conical portion, said conical portion presenting a geometrical cavity for a conically shaped bullet or round projectile; and
wherein said locking member includes a linking portion receivable within an opening end of said firearm bore accessory component in an interference engagement, said interference engagement formed by a radially inward extension tab on a rearward end of said firearm bore accessory component.

15. The firearm accessory coupling system of claim 14 wherein said linking portion includes a cylindrical segment having a diameter that is slightly larger than an internal diameter of said extension tab, such that upon insertion, said cylindrical segment will be held in place by said extension tab.

16. The firearm coupling system of claim 12, wherein said firearm bore accessory component includes multiple outer surface diameter indentations.

17. A firearm accessory coupling system, comprising:
an elongated connecting member having a rearward end and a forward end, including:
a middle body component; and
an accessory-end component, wherein said accessory-end component includes a recess cut therethrough;
a sleeve in translational engagement with said elongated connecting member's accessory-end component, said sleeve being in mechanical communication with a resilient component via a pin;
said resilient component within an interior portion of said elongated connecting member, capable of recovering its size and shape after deformation caused by compressive stress, said resilient component providing a biasing force against said sleeve in a direction towards said elongated connecting member forward end, said interior portion including an inner diameter proximate said forward end of said elongated connecting member, said interior portion inner diameter being smaller than an outer diameter of a bulbous end of a locking member, such that said bulbous end is secured within said interior portion, and prohibited from axial release through an opening in said forward end, and wherein as a result of said biasing force of said resilient component, said sleeve encloses said recess, securing said locking member within said accessory-end component recess;
a loading element comprising said locking member at a rear end having said bulbous end and a shaft that extends the bulbous end from an intermediate flange, configured to be received by said recess within said accessory-end component recess at said elongated connecting member forward end, and said intermediate flange extending radially outwards;
a receiving coupler attachable to said rearward end of said elongated connecting member; and
a firearm bore accessory component removably attachable to said loading element;
wherein said sleeve is translatable between an engaged position wherein said sleeve encloses said recess, to a disengaged position wherein said sleeve moves toward said middle body component of the elongated connecting member, thereby exposing said recess; and wherein said flange of said loading element contacts and engages said accessory-end component at a forward end opening of said elongated connecting member forward end, ensuring coaxial alignment of said firearm bore accessory component with said elongated connecting member.

* * * * *